Patented May 22, 1934

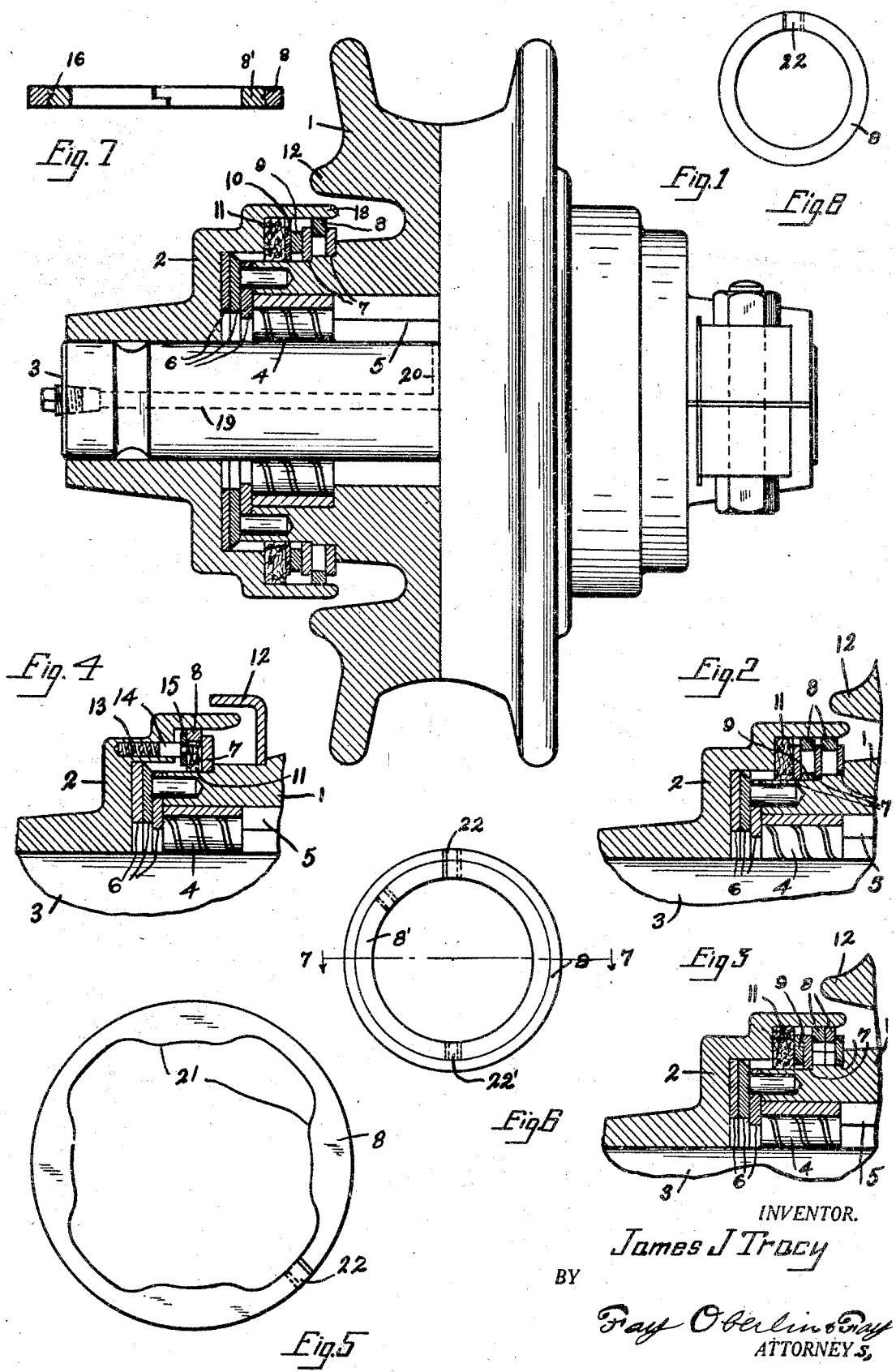

1,959,697

UNITED STATES PATENT OFFICE 1,959,697

DUST PROTECTOR FOR TRACK ROLLERS, ETC.

James J. Tracy, Shaker Heights, Ohio

Application August 4, 1931, Serial No. 555,092

1 Claim. (Cl. 286—5)

The present invention relates to a novel dust, mud and water-proof protection means for the bearings in wheels, track rollers, pulleys, and the like. The accompanying illustrated embodiment is most precisely adapted to the track rollers and wheels of tractors of the track-laying type.

One object of the present invention is to provide a means for the exclusion of foreign particles from a wheel bearing which shall be unaffected by an appreciable longitudinal or radial floating of the track roller in relation to the shaft upon which the roller is mounted.

Another object is to provide first a gravity and circuitous method of rejecting the great bulk of dirt, second an all metallic seal arranged to exclude practically all of the dust, mud and water reaching it and, thirdly a fabric seal arranged to either reject or absorb any dust, mud or water that oozes past the metallic seal. Objects and advantages additional to those above enumerated shall become apparent as the following description proceeds. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:

Fig. 1 is a half-section view of a track roller and mechanism for its mounting embodying the principle of my invention; Figs. 2, 3 and 4 are fragmentary sectional views illustrative of alternative forms of construction for the protective sealing means; Fig. 5 shows a special form of lap joint expansion ring; Fig. 6 illustrates a form of variable expansion sealing ring; Fig. 7 is a section taken substantially upon line 7—7 of Fig. 6; and Fig. 8 shows a simple type of expanding lap joint ring embodied in the drawing.

Referring more particularly to Figs. 1 to 4 inclusive, a track roller generally designated by the numeral 1, has associated therewith the stationary hub cap 2 which is secured to the shaft 3. The roller 1 is rotatably mounted upon the shaft 3 through the roller bearings 4. The spacers 5 are provided to hold the bearings 4 in suitable rotational relationship. The end thrust of the track roller 1 is carried into the hub cap 2 through the thrust washers 6. The metallic washers 7 are shrunk on to the annular shoulders of the hub of the roller 1 and form grooves or guides for the expansible spring rings 8. The guide washers 7 may also be made integral with the hub of the roller 1. The exterior periphery of the expansible sealing rings 8 are adapted to bear against the interior bore of the stationary hub cap 2. The ends of the rings 8 meet in a lap joint as illustrated in Figs. 5, 6, 7 and 8. Interiorly contiguous to the guide rings 7 and sealing rings 8 are the spacer rings 9 which are for the purpose of suitably positioning the guide rings 10. The guide rings 10 serve to maintain the felt rings 11 in proper position against the hub cap 2. The flange 12 of the track roller 1 protrudes beyond the lip of the hub cap 2. Fig. 2 shows two spring rings 8 installed in separate grooves while Fig. 3 shows two of such rings installed in the same groove. Fig. 4 shows the sealing ring 8 being continually forced against the guide ring 7 by a plurality of circumferentially spaced coil compression springs 13 which press against the dowels 14 which, in turn, hold the ring 15 from turning and force it against the ring 8. The felt ring 11 may be placed inside of the spring ring 8 in this latter described form of construction shown in Fig. 4. As shown in Fig. 5, the ring 8 may have a plurality of interior circumferential protuberances 21 to provide greater area of contact with guide rings 7. Fig. 8 shows a simple type of expanding ring which may be used in the invention.

The expansible ring shown in Figs. 6 and 7 is a double ring, one inside of the other. The rings are held in line by the tonque 16 on one ring and a corresponding groove on the other ring. The expansive pressure may be varied by the relative position of the lap joint 22' of the inner ring 8' in relation to the position of the lap joint 22 of the outer ring 8. The maximum expansive pressure of the combined rings being exerted when the joints 22 and 22' are superimposed, while the minimum expansive pressure is exerted when the joints are diametrically opposite each other. These variable positions of the lap joint 22' are illustrated by the dotted lines in Fig. 6. When any of the rings are installed in the hub caps, the butt joint should be open a substantial amount as shown in Figs. 5, 6, 7 and 8.

Ample clearances are provided throughout to allow for wear which will take place in service between the bearing 4 and the shaft 3. When this wear occurs, the hub of the truck roller 1 will no longer be concentric with the hub cap 2; however, as the spring ring 8 contacts with the inner surface of the hub cap 2 throughout its circumference and has ample clearance space between its inner surface and the outer surface of the hub of the track roller 1, the efficiency of the seal will not be impaired. When the track roller 1 floats longitudinally of its axis between the thrust washers 6 and the corresponding set of washers (not shown) installed on the other end of the shaft, the guide ring 7 will carry the spring rings 8 with them and the spring rings 8 will oscillate longitudinally on the interior bore of the hub cap 2.

The great bulk of the dirt is rejected by the overhanging flange 12 of the track roller 1 which overlaps the lip 18 of the hub cap 2. The remainder of the dirt, excepting for a very few fine particles, is excluded by means of the sealing contact of the spring ring 8 with the inner bore of the hub cap 2. Very few fine particles or moisture that escape past the ring 8 are caught or absorbed by the felt ring 11. A lubricant may be suitably forced to the interior mechanism through the ducts 19 and 20 by replacing the plug at the entrance of the duct 19 with the nozzle of a force pump.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

In a journal bearing assembly subject to radially and axially directed loads, said assembly including fixed and movable annular elements in spaced relation to each other, sealing means for protecting said bearing from the ingress of dirt and the like comprising a plurality of expansible metal sealing rings positioned between said fixed and movable elements, said rings being of less width than the space between said elements and contacting with one of said elements, a plurality of separator rings also of less width than the space between said elements and contacting with the other of said elements, said separator rings being alternately spaced between said sealing rings and a ring of resilient foraminous material filling the space between said annular elements and positioned laterally adjacent said above-named series of rings.

JAMES J. TRACY.